Oct. 12, 1954  R. T. BANISTER  2,691,196
SHELL MOLD
Filed May 21, 1952
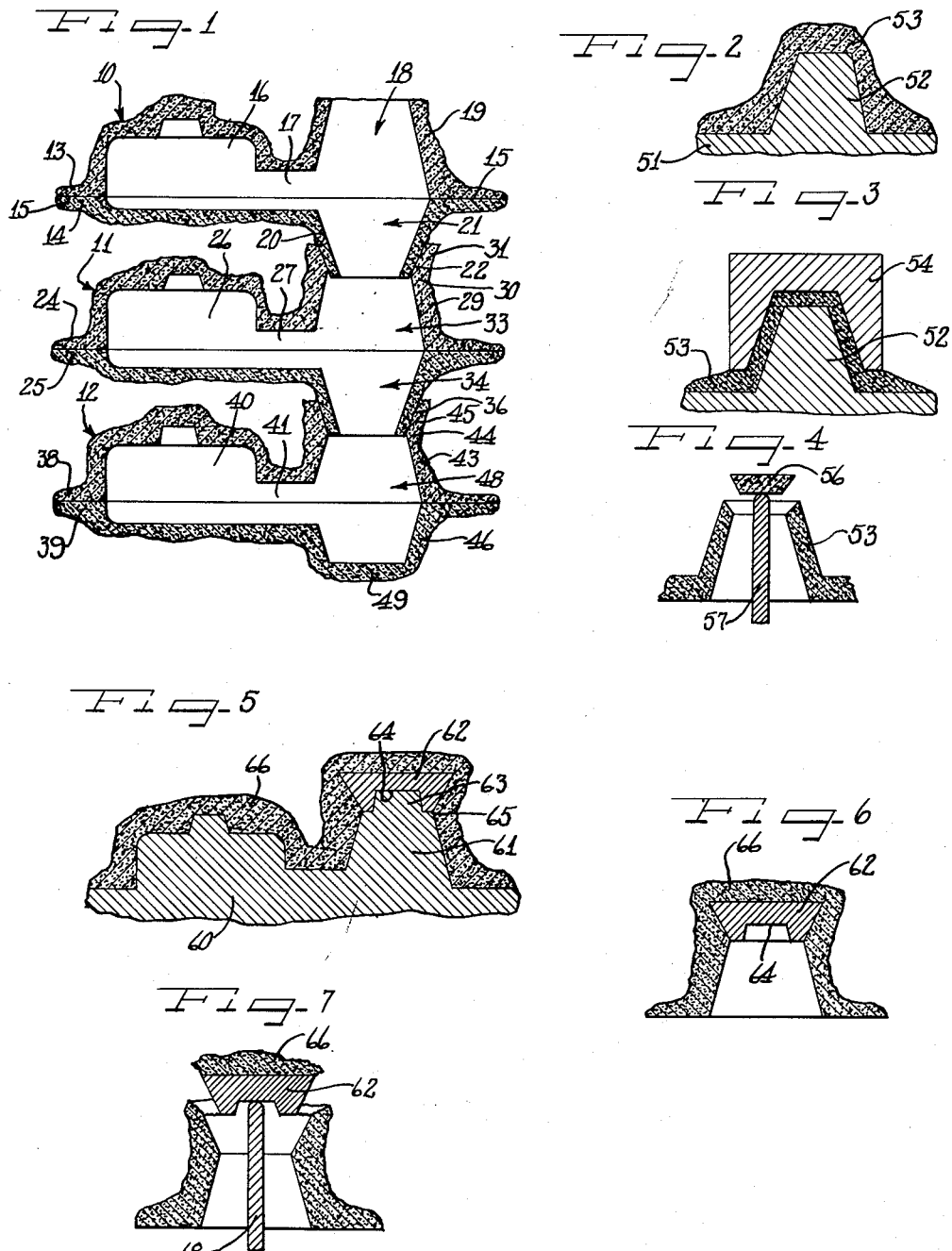
Inventor
Robert T. Banister
by Hill, Sherman, Meroni, Gross & Simpson
Attys Patented Oct. 12, 1954

2,691,196

UNITED STATES PATENT OFFICE 2,691,196

SHELL MOLD

Robert T. Banister, Chesterland, Ohio, assignor to Thompson Products, Inc., Cleveland, Ohio, a corporation of Ohio Application May 21, 1952, Serial No. 289,026

5 Claims. (Cl. 22—130)

The present invention is directed to a mold assembly and to a method of making the same.

The principles of the present invention are particularly applicable to the manufacture of molds by the so called "shell mold" process in which finely divided refractory particles such as sand, in combination with a thermosetting resin are applied to a pattern plate having the configuration desired in a portion of the cast article ultimately to be produced, and the sand-resin mixture is heated in contact with the pattern at a temperature and for a time sufficient to cure or set the resin and thereby bond the sand particles together into a relatively rigid shell type mold. Experience has shown that this type of mold reproduces very accurately the contour of the pattern in reverse, and that when two complementary shell molds are combined to form a composite mold, the casting produced in the mold cavity is accurate to very close tolerances, so that subsequent machining of the cast article is held to a minimum.

The normal procedure for casting molten metal into shell molds involves clamping the complementary shell mold sections together in face-to-face contact to form the mold cavity. Although often these shells are supported with their parting surfaces in a vertical plane, it is frequently advantageous to make castings with the parting surfaces horizontal. The latter arrangement, however, has the disadvantage that more space is required.

The present invention provides a means for stacking several shell molds together with the parting faces of each pair of mold sections in the same horizontal plane and further providing a continuous gate feeding each of the stacked molds to provide a common sprue portion on each of the castings produced.

An object of the present invention is to provide an improved shell mold assembly including means for stacking a plurality of shell molds in superimposed relationship, with a continuous gate feeding the molds in superimposed relationship.

Another object of the present invention is to provide a shell mold assembly in which the pairs of mold sections making up the shell mold assembly have their parting faces substantially in the same horizontal plane, with the separate molding cavities being in superimposed stacked arrangement.

Another object of the present invention is to provide a method for providing shell molds with inter-engaging surfaces which permit a plurality of the completed mold sections to be locked together in stacked relation.

Other objects and features of the present invention will be apparent to those skilled in the art from the following description of the attached sheet of drawings, which, by way of preferred example, illustrate the assembly and method of the present invention.

On the drawings:

Figure 1 is a view in elevation illustrating the stacked mold structure;

Figure 2 is a fragmentary view with parts in elevation of a pattern and the resin-sand mixture applied thereto;

Figure 3 is a fragmentary view of the sprue forming portion of the pattern of Figure 2 illustrating the manner in which the shaping tool is employed to smooth out the resin-sand mixture applied thereto;

Figure 4 is a view similar to Figure 3 and illustrates the manner in which a portion of the shell mold is broken away to provide the sprue;

Figure 5 is a fragmentary view, with parts in elevation of the other half of the pattern employed in conjunction with the pattern of Figure 2;

Figure 6 is a fragmentary cross-sectional view of the gate forming means after partial disassembly thereof; and Figure 7 is a view similar to Figure 6 illustrating the manner in which a portion of the gate former is broken away from the completed shell mold.

As shown on the drawings:

The showing of Figure 1 includes three separate molds 10, 11 and 12 stacked together in superimposed relationship. Each of the molds 10 through 12 consist of a pair of complementary mold sections, the mold 10 consisting of an upper mold section 13 and a lower mold section 14 in abutting contact along a horizontal parting line 15. The cooperating mold sections 13 and 14 define a suitably recessed molding cavity 16 and a runner 17 which is in communication with a sprue generally indicated at 18.

The walls 19 of the mold section 13 which define the configuration of the sprue 18 are frusto-conical in configuration. The lower mold section 14 also has similarly shaped frusto-conical wall portions 20 which define a sprue section 21 in registry with the sprue 18 when the mold sections 13 and 14 are in assembled position. The exterior of the frusto-conical wall 20, indicated at numeral 22 are made smooth, by a method to be hereinafter described so that this portion of the mold assembly may be snugly received within the next lower mold 11.

The mold 11 is similarly composed of a pair of complementary mold sections 24 and 25 which define a molding cavity 26 and a runner 27. The sprue former of mold section 24 includes a frusto-conical portion 29 which terminates in a restricted throat 30. Extending from the restricted throat 30 is an outwardly flared frusto-conical portion 31 which snugly receives the smooth outer surface 22 of the wall 20.

The mold sections 24 and 25 each provide sprue sections 33 and 34 in registry with the sprue sections 18 and 21 of mold 10. The lower mold section 25 is identical with the mold section 14 of mold 10 and has a smooth surfaced frusto-conical wall 36 for engagement with the next lower mold section 12.

The mold section 12 is composed of a pair of cooperating mold sections 38 and 39, the mold section 38 being identical with mold section 24. The cooperating mold sections define a molding cavity 40 and a runner 41. The upper mold section 38 has a frusto-conical wall portion 42 terminating in a restricted throat 44 and an outwardly tapered frusto-conical portion 45 which snugly receives the similarly tapered wall portion 36 of the mold section 25.

The lower mold section 39 is substantially similar to the mold sections 14 and 25 except that the frusto-conical walls 46 which in cooperation with the frusto-conical walls 43 define a sprue section 48 in communication with the sprue sections of the other mold sections, is provided with a continuous base 49.

With the molds 10, 11 and 12 in superimposed relationship, as indicated in Figure 1, molten metal is introduced into the sprue 13 and fills the cavities 40, 26 and 16, in that order. Metal solidified within the respective sprue sections provides a common sprue for the three castings. The superimposed molds may be set in a container, and steel shot or sand packed around the molds to maintain the molds in upright position. The weight of the packing fills in over the bottom pair of shells and in doing so supports the next pair of shells above.

The methods employed in making the various mold sections are illustrated in Figures 2 through 7. Figures 2 through 4 illustrate the manner of forming the mold section with the male joint member, while Figures 5 through 7 illustrate the manner of making the female joint member.

The mold sections 14 and 25 are produced by providing a pattern plate 51 of iron, or other suitable metal, the pattern 51 having a contour which is to be reproduced in the final casting. The pattern 51 includes a frusto-conical projection 52 which forms a section of the sprue in the final mold structure. The entire contoured surface of the pattern 51, including the projection 52 is coated with a resin-sand mixture of the type employed in the well known shell-mold process. The molding material consists of a dry mixture of finely divided silica sand and a thermosetting binder, the sand making up about 90 to 95% of the composition, and the plastic binder making up the remainder. The binder is composed of a phenol-formaldehyde condensation product, either in the A or B stage in an amount equal to about 90% of the binder composition, and the remaining 10% consists of a source of formaldehyde, such as hexamethylene-tetramine. In order to prevent sticking of the resin-sand mixture to the pattern, the pattern is coated with a thin film of silicone lubricant. After the pattern has been heated to a temperature of about 350 to 400° F. the sand-resin mixture is heaped over the pattern surface by some mechanical means. The resin is thereby softened sufficiently to form a continuous coating over the entire surface of the heated pattern. After a matter of a few seconds, a shell coating is built up to a thickness on the order of about $\frac{1}{32}$ of an inch or more. The excess sand-resin mixture is removed by inverting the pattern allowing the unbonded particles to fall away. The resin-sand coating has been illustrated in Figure 2 by the numeral 53.

After the resin-sand coating has been applied, but before sufficient heat has been added to set the resin completely, the coating of resin and sand covering the projection 52 is shaped to provide a smoothly tapered surface. A frusto-conically recessed tool 54 is placed over the coated projection 52 and pressed thereagainst to smooth out the irregular coating of resin and sand about the projection 52. The smoothing of the resin-sand coating is carried out while the coating 53 is still sufficiently plastic to be capable of relatively smooth flow.

Next, the tool 54 is removed and the pattern 51 together with the coating 53 is introduced into a furnace maintained at a temperature sufficient to set the resinous constituent into an infusible state, usually at a temperature of 500 to 600° F. At these elevated temperatures, the hexamethylene-tetramine decomposes into ammonia and formaldehyde, the ammonia acting as a basic catalyst for the condensation reaction. After curing, the resin-sand mixture is easily stripped from the pattern 51.

After the resinous coating has been cured and stripped from the pattern, a portion of the coating 53 overlying the projection 52, and indicated at numeral 56 is broken away as indicated in Figure 4 by means of tapping with a rod 57 from the inside of the shell mold.

The female portion of the locking joint is made by the method illustrated in Figures 5 through 7. Figure 5 illustrates a pattern 60 having a contour which in combination with the contour of pattern 51 defines the molding cavity, the pattern 60 having a generally frusto-conical projection 61. The sprue-forming members associated with the pattern 60 are in two parts, the frusto-conical projection 61 being frictionally engaged with a second frusto-conical member 62 having a taper in reverse of that in the portion 61. The member 62 and the projection 61, when in engagement, thereby form a sprue section former including a restricted throat portion 65 at the junction between the member 62 and the projection 61.

The entire pattern 60 as well as sprue forming members are then coated with a resin-sand mixture 66 of the type previously described and the coating 66 is cured onto the pattern while the member 62 and the projection 61 are engaged. When the resulting shell is stripped from the pattern 60, however, the member 62 and the projection 61 can be readily disengaged, the member 62 remaining encased in the resulting shell. As illustrated in Figure 7, the member 62 as well as a portion of the coating overlying that member are broken away from the remainder of the shell mold by means of a rod 68 introduced from the inside of the shell mold.

The shell molds thus produced are then stacked together in vertical alignment, as illustrated in Figure 1 and suitably clamped together to provide a mold assembly including a plurality of superimposed separate molds joined together through a continuous sprue.

It will be appreciated that various modifications and variations may be effected without departing from the scope of the novel concepts of the present invention.

I claim as my invention:

1. A multiple casting mold comprising a plurality of molding shells each composed of mating sections coacting to define a mold cavity, a sprue defining portion and a runner connecting the sprue with the mold cavity, male and female portions on opposite ends of the sprue defining portion of the molds, the female portion of one sprue end being adapted to snugly receive the male portion of another sprue end to form a stack of molds with nested sprue portions providing a continuous sprue for all the molds.

2. A multiple casting mold comprising a plurality of molding shells each composed of mating sections coacting to define a mold cavity, a sprue defining portion and a runner connecting the sprue with the mold cavity, male and female portions on opposite ends of the sprue defining portion of the molds, the female portion of one sprue end including an outwardly flared seat, and the male portion of another sprue end having an inwardly tapered surface arranged to be snugly received within said seat for forming a stack of molds with nested sprue portions providing a continuous sprue for all the molds.

3. A molding shell comprising refractory particles bonded together by a set of thermosetting resinous binder, said molding shell having surfaces defining an interior molding cavity and an open-ended sprue communicating with said molding cavity, said sprue including a constricted neck and an outwardly flared surface extending from said neck at one end of said sprue, and having a tapered surface at the opposite end of a size sufficient to be snugly received within the outwardly flared surface at the other end of said sprue, whereby a plurality of said shells may be stacked together in superimposed relationship with the tapered surface of one of said shells being seated on the outwardly flared surface of another of said shells, and the open-ended sprue of said shells being in registry to provide a continuous sprue for directing molten metal into the molding cavities associated with said shells.

4. A shell mold assembly comprising a pair of complementary mold sections, one of said mold sections having tapered wall portions defining a hollow sprue and the second of said mold sections having wall portions defining a hollow sprue having a restricted throat and an outwardly flared edge extending from said throat, said mold sections when in assembled relation having their respective sprue in registry to form an open-ended sprue, and a third mold section having wall portions defining a hollow sprue of substantially the same configuration as said sprue in said second mold section, said third mold section receiving said tapered wall portions of said first mold section in snug engagement along the outwardly flared edge defining the hollow sprue of said third mold section.

5. A method of making a shell mold assembly which comprises providing a pair of patterns, one of said patterns having a first tapered sprue forming protuberance thereon, applying a coating of a mixture of refractory particles and a thermosetting resinous binder to said one pattern and onto said first protuberance, shaping the mixture around said protuberance to form a smooth surfaced mixture of refractory particles and binder about said first protuberance, heating the resulting coated pattern at a temperature sufficiently high to set said resin and to form a relatively rigid first shell, removing said pattern from said shell, breaking out a portion of the resulting first shell in the tapered sprue formed by the bonding of said particles about said first protuberance, providing the other of said patterns with a second sprue forming protuberance consisting of a plurality of cooperating shape-defining members which in assembled relation define a shape including a restricted neck portion and a wider head portion extending from said neck portion, applying a mixture of refractory particles and a thermosetting resinous binder to said other pattern and over said shape-defining members in assembled relation, curing said mixture in contact with said other pattern to set said resin and form a relatively rigid second shell, disengaging said shape-defining members after the resinous binder has been cured, breaking out a portion of the resulting second shell in the gate formed by the bonding of said particles about said second gate forming protuberance, assembling said first and second shells together to provide a molding cavity having an open-ended sprue therein defined by the sprues of said first and second shells, and inserting the tapered sprue of said first shell into a sprue in a third shell having the configuration of said second shell to provide a stacked arrangement of shell molds.

References Cited in the file of this patent

UNITED STATES PATENTS

| Number | Name | Date |
|---|---|---|
| 775,794 | Bone et al. | Nov. 22, 1904 |
| 2,001,583 | Poe | May 14, 1935 |
| 2,138,624 | Campbell | Nov. 29, 1938 |
| 2,150,510 | Le Jeune | Mar. 14, 1939 |

FOREIGN PATENTS

| Number | Country | Date |
|---|---|---|
| 364,225 | Germany | Nov. 18, 1922 |